H. O. SHISSLER.
TROLLEY WIRE SWITCH.
APPLICATION FILED APR. 18, 1907.
928,157.
Patented July 13, 1909.
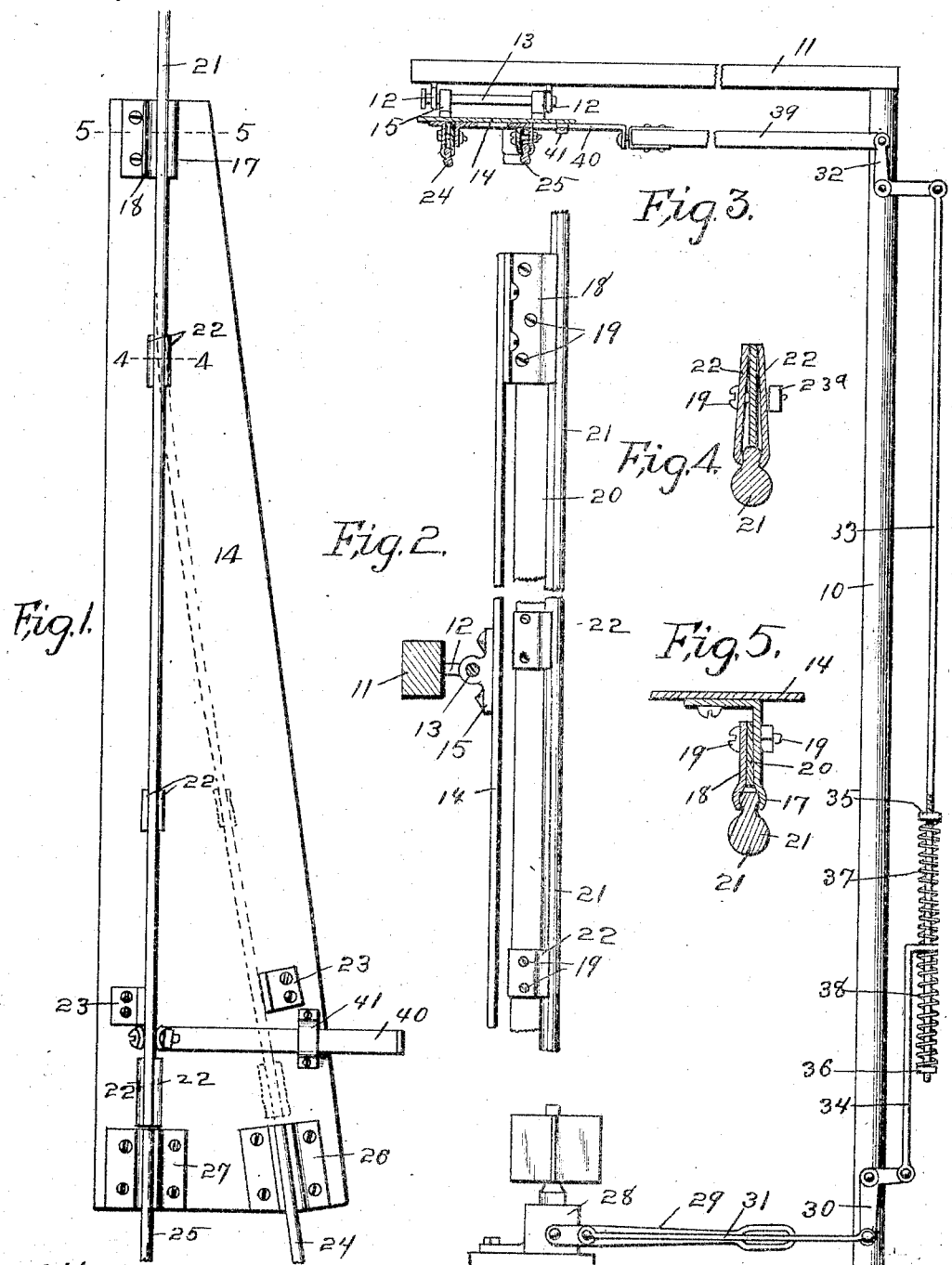
Witnesses
a. G. Hague
F. C. Dahlberg.
Inventor
H. O. Shissler
by Orwig & Lane attys.

UNITED STATES PATENT OFFICE.

HOWARD O. SHISSLER, OF DES MOINES, IOWA.

TROLLEY-WIRE SWITCH.

No. 928,157.　　　　Specification of Letters Patent.　　　　Patented July 13, 1909.

Application filed April 18, 1907. Serial No. 368,825.

*To all whom it may concern:*

Be it known that I, HOWARD O. SHISSLER, a citizen of the United States, residing at Des Moines, in the county of Polk and State of Iowa, have invented a certain new and useful Trolley-Wire Switch, of which the following is a specification.

The object of my invention is to provide a trolley wire switch in which the movable switch wire is automatically actuated in unison with the movements of the switch point in the track below the trolley wire.

A further object is to provide a trolley wire switch so arranged that when adjusted to either position, will form a continuous uniform curve without angles, so that the trolley wheel may follow it without excessive wear, such as would be occasioned if there were sharp angles formed in it.

A further object is to provide a switch of this kind in which the current may be passed continuously along the trolley wire, regardless of the position of the trolley wire switch point, and also to provide a trolley wire switch plate so supported that it will stand in line with the trolley wire, and tilt in the same direction as the wire, so that the trolley wheel will not strike upon either end of the switch plate when approaching it, as would be the case if the trolley wire switch plate were rigidly supported.

My invention consists in the arrangement, construction and combination of the various parts of the device, whereby the objects contemplated are attained, as hereinafter more fully set forth, pointed out in my claims, and illustrated in the accompanying drawings, in which—

Figure 1 shows an inverted plan view of a trolley wire switch embodying my invention. The dotted lines show the movable trolley wire switch point in its adjusted position. Fig. 2 shows an edge view of a part of the trolley wire switch plate, and the movable switch point. Fig. 3 shows an end view of the trolley wire switch supported on a pole, and connected with a railway rail switch to be operated in unison with the movable switch point. Fig. 4 shows a transverse sectional view on the line 4—4 of Fig. 1, and Fig. 5 shows a transverse sectional view on the line 5—5 of Fig. 1.

Referring to the accompanying drawings, I have used the reference numeral 10 to indicate a trolley wire pole, having the supporting arm 11 thereon. Projecting downwardly from the supporting arm are the loops 12, through which a pivot pin 13 is extended. The trolley wire switch plate is indicated by the numeral 14, and is made of metal that forms a good electrical conductor. On top of the plate 14 near its central portion, are the loops 15, designed to receive the pivot pin 13, thus pivotally supporting the plate 14 in such manner that its ends may tilt up and down. Secured to one end of the plate 14 is a bracket, having a grooved clamping jaw 17 at its lower end. Connected with the bracket is a clamping jaw member 18, detachably held to the bracket by the bolt 19. Between the parts 17 and 18 is a flat spring 20, held therein by the bolts 19 and forming a flexible trolley wire support that will form a regular curve when in any position of its adjustment, and will hold the trolley wire against sagging downward.

The trolley wire is indicated by the numeral 21 and is formed with grooves in its sides to receive the jaws 17 and 18, so that the bolts 19 may firmly hold both the spring 20 and the trolley wire 21. This trolley wire 21 extends to a point near the opposite end of the trolley wire switch plate 14, and it is connected with the spring 20 at intervals throughout its length by means of a pair of clamping jaws 22, held together by the bolts 23, as shown in Fig. 4. The material of which the trolley wire 21 is made is comparatively soft, and if unsupported, would be likely to bend on sharp angles. However, by providing the flat spring 20 for supporting it, it will always bend on a uniform curve, as shown by dotted lines in Fig. 1, when its free end is turned as shown in said figure. Secured to the under side of the plate 14 are the lugs 23 to limit the outward movement of the movable switch wire. At the opposite end of the plate 14, two trolley wires 24 and 25 are connected by means of brackets 26 and 27, similar to the brackets shown in Fig. 5. Said brackets 26 and 27 are so disposed upon the plate 14, that when the movable trolley wire switch is in one position, it will be in line with the trolley wire 27, and when in another position of its movement, it will be in line with the wire 24.

I have provided for operating the trolley wire switch point in unison with a railway switch point beneath it as follows: The numeral 28 indicates a railway switch of ordinary construction, having an operating lever 29, and designed to move a movable switch point. Mounted on the pole 10 near its base, is a bell crank lever 30, connected by a link 31, with the lever 29. Near the top of the pole is a second bell crank lever 32. These levers 30 and 32 are connected by means of a rod 33, which is attached to the lever 32 and extended downwardly, and slidingly connected with a rod 34, that is connected with the lever 30 and extends upwardly. On the rod 33 are two adjusting nuts 35 and 36, and extensible coil springs 37 and 38 are placed on the rod 33 to engage said nuts, and also to engage the part of the rod 30 through which the rod 33 is passed. These springs normally hold the rod 34 in its position with relation to the rod 33, but the rod 34 may be moved in either direction against pressure, after the rod 33 has been moved to either limit of its movement. The bell crank lever 32 is connected by means of a wooden bar 39, with a sliding arm 40, mounted in a bracket 41, on the under spring of the plate 14, and connected with the trolley wire switch 21. By this means, it is obvious that a movement of the lever 29 will operate the railway switch point, and at the same time it will move the trolley wire switch point in a corresponding direction. The use of the spring device in the rods that connect the bell crank levers, is desirable for the reason that the trolley wire switch point will always be firmly held by spring pressure, in its position in engagement with one or the other of the lugs 23, because after the trolley wire switch point is moved to its position, then an additional movement is given to the rod 34, which will cause one of the springs to be compressed, and thus hold the trolley wire switch point firmly to position in engagement with one of the lugs. By this means, the trolley wire switch point will always be held accurately in line with one or the other of the wires 24 and 25.

In practical use, it is obvious that no matter in what position the movable trolley wire switch point may be, the current will travel along the conductor wire and through the plate 14 without forming an arc at the point where the wires are connected under the switch plate, and furthermore, there will be no arc formed when the trolley wheel is passing under the switch wire, because it will be in contact with a part of the trolley wire that is charged with the current by spring pressure, in either one or the other of its positions, and thus will always be in line with the trolley wires.

Having thus described my invention, what I claim and desire to secure by Letters Patent of the United States, therefor, is—

1. In a device of the class described, the combination of a plate, a trolley wire fixed to one end of the plate and extended under it to a point near the other end of the plate, a flexible trolley wire support fixed at one end to the plate and extended longitudinally of the said trolley wire and fixed to it, and designed to prevent the wire from sagging, two trolley wires spaced apart and fixed to the opposite end of said plate, and means for moving the free end of the first mentioned trolley wire and the flexible trolley wire support to position in line with either of the wires at the other end of the plate.

2. In a device of the class described, the combination of a metallic switch plate, two trolley wires spaced apart and fixed to one end of the switch plate, and in electrical contact therewith, a trolley wire fixed to the other end of the switch plate and electrically connected therewith and extended under the switch plate to a point adjacent to the first mentioned trolley wire, and a flexible trolley wire support fixed to the free portion of the trolley wire beneath the switch plate and also fixed to the switch plate at the end opposite from the two trolley wires, and being capable of free lateral movement and of supporting the wire against downward movement.

3. In a device of the class described, the combination of a metallic switch plate, a metallic bracket fixed to one end thereof, and formed with a clamping jaw, a clamping plate bolted to the said bracket, a trolley wire between said clamping plate and clamping jaw, a spring above the trolley wire and between said plate and bracket, bolts for adjustably and detachably connecting the spring and the trolley wire with the bracket, a number of clamping devices for connecting the spring and trolley wire, two trolley wires fixed to the opposite end of the plate, and electrically connected therewith, lugs fixed to the under portion of the switch plate, to limit the outward movement of the movable wire to positions in line with the two trolley wires, and means for moving the movable wire and its spring.

4. In a device of the class described, the combination of a trolley wire switch having a movable switch point, a rod connected with the movable switch point, a bell crank lever connected with said rod, a downwardly extended rod connected with the bell crank lever, a second bell crank lever connected with the lower end of said downwardly extended rod, a railway rail switch, a rod connected with the latter bell crank lever and with the railway rail switch, one of said rods being formed of two parts slidingly connected with each other, and two springs mounted on one of said parts with their adjacent ends in engagement with the other one of said parts whereby a sliding longitudinal movement of said parts relative to each other is permitted, and whereby the switch point is yieldingly held at either one of its limits of movements.

Des Moines, Iowa, 5/4/07.

HOWARD O. SHISSLER.

Witnesses:
 J. RALPH ORWIG,
 S. T. CHRISTY.